(12) United States Patent
Besserer et al.

(10) Patent No.: US 6,895,358 B2
(45) Date of Patent: May 17, 2005

(54) METHOD AND APPARATUS FOR LOCATING AN EDGE DISPOSED AT THE JUNCTION BETWEEN TWO SUBSTANTIALLY PLANE SURFACES

(75) Inventors: Bernard Besserer, La Rochelle (FR); Carl Frelicot, Sainte-Soulle (FR); Christian Roure, Craponne sur Arzon (FR); Eric Tregoat, Paris (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 10/671,711

(22) Filed: Sep. 29, 2003

(65) Prior Publication Data

US 2004/0128075 A1 Jul. 1, 2004

(30) Foreign Application Priority Data

Oct. 16, 2002 (FR) .............................. 02 12896

(51) Int. Cl.[7] .................... B60R 27/00; G08B 21/00
(52) U.S. Cl. .................. 702/159; 250/221; 250/574
(58) Field of Search ........................ 702/159; 307/326; 250/221, 574; 105/426; 340/825.49

(56) References Cited

U.S. PATENT DOCUMENTS

| 4,490,038 A | | 12/1984 | Theurer et al. |
| 4,491,917 A | * | 1/1985 | Higgins et al. ............... 701/49 |
| 5,119,739 A | * | 6/1992 | Templeton et al. ......... 105/341 |
| 5,758,453 A | * | 6/1998 | Inage .......................... 49/118 |
| 6,341,563 B1 | * | 1/2002 | Gal et al. ..................... 104/28 |
| 2002/0044048 A1 | | 4/2002 | Watanabe et al. |

FOREIGN PATENT DOCUMENTS

| DE | 22 21 575 A | | 11/1973 | |
| DE | 3242134 A | * | 5/1984 | ............. B60R/3/02 |
| WO | WO 98 58148 A | | 12/1998 | |

* cited by examiner

*Primary Examiner*—Kamini Shah
(74) *Attorney, Agent, or Firm*—Sughrue Mion, PLLC

(57) ABSTRACT

A method and apparatus for locating an edge disposed at the junction between two substantially plane surfaces, and in particular to a method and apparatus for locating a platform edge coping relative to a rail vehicle, the method comprising the following stages: a) transmitting waves from at least one transmitter; b) receiving the echoes of the waves transmitted by the transmitter in at least two receivers; c) analyzing the energy of the signal received by each receiver to determine the value of the angle of inclination; d) computing the position of the main points of impact of the waves on the two surfaces by measuring the travel time of the signal transmitted by the transmitter, and received by each receiver; and e) locating the edge by computing the point corresponding to the intersection of the straight lines passing through the two points of impact and forming respective angles with the main transmit axis of the) transmitter.

14 Claims, 5 Drawing Sheets

METHOD AND APPARATUS FOR LOCATING AN EDGE DISPOSED AT THE JUNCTION BETWEEN TWO SUBSTANTIALLY PLANE SURFACES

The invention relates to a method and to apparatus for locating, in a reference plane, an edge disposed at the junction between two substantially plane surfaces, and in particular to a method and to apparatus for locating a platform edge coping relative to a rail vehicle. The invention also relates to a guiding method using such a location method and in particular a method of guiding a moving step on a rail vehicle relative to a platform edge coping.

BACKGROUND OF THE INVENTION

In the field of rail vehicles, it is known that moving steps can be used to make it easier for passengers to board from a platform and to alight onto a platform, it being possible for such steps to have strokes controlled automatically by means of telemeters in order to optimize the final resulting gap between the step and the platform. Such apparatus is, for example, disclosed in Document U.S. Pat. No. 6,341,563 which describes a system for controlling a moving step relative to a platform. In that system, two telemeters are used to measure the distance between the moving step and the platform by means of a triangulation method, each telemeter being made up of an ultrasound transmitter and detector. Unfortunately, locating the platform by using a location method suffers from the drawback of not enabling the edge coping of the platform to be located very accurately, and of further requiring the two ultrasonic telemeters to be far enough away from the platform and far enough apart to give a result that can be used. As shown in FIG. 1, the triangulation method makes it possible, by means of two ultrasonic telemeters T carried by the vehicle to locate a point P' corresponding to the point of intersection between two circles representing distance to the obstacle as measured by each of the telemeters. As shown in FIG. 1, the point P' obtained by the triangulation method gives an acceptable approximation of the point P corresponding to the edge coping of the platform when the two ultrasonic telemeters are far enough apart. However, when the two telemeters T are close together, as shown in FIG. 2, the two circles representing distance to the obstacle as measured by the telemeters cannot intersect, and the triangulation method no longer makes it possible to measure the position of the point P'.

OBJECTS AND SUMMARY OF THE INVENTION

Thus, an object of the present invention is to provide a method and apparatus that make it possible to locate the edge coping of a platform relative to a rail vehicle with good accuracy. Another object of the invention is to provide a location method that can operate with telemeters disposed close together.

To this end, the invention provides a method of locating, in a reference plane, an edge that is disposed at the junction between two surfaces that are substantially plane, said reference plane being substantially perpendicular to the surfaces, said method comprising the following stages:

a) transmitting waves from at least one transmitter disposed in the reference plane, said transmitter having a transmit solid angle that enables at least some transmitted waves to reach both of said surfaces on either side of said edge;

b) receiving the echoes of the waves transmitted by the transmitter in at least two receivers which are disposed in the reference plane such that one of the receivers essentially receives the waves reflected by one of the surfaces while the other receiver essentially receives the signals reflected by the other surface, the positions of the receivers and of the transmitter in the reference plane being known by construction;

c) analyzing the energy of the signal received by each receiver to determine the value of the angle of inclination between the main transmit axis of the transmitter and the normal to the surface that has reflected the waves picked up by said receiver;

d) computing the position in the reference plane of the point of impact of the waves on each surface by measuring the travel time of the signal transmitted by the transmitter and received by each receiver; and e) locating said edge in the reference plane by computing the point corresponding to the intersection of the straight lines passing through the respective points of impact on the two surfaces and forming respective angles with the main transmit axis of the transmitter that correspond to the angles of inclination computed during stage c) for each of said surfaces.

In particular implementations, the location method of the invention may have one or more of the following characteristics taken in isolation or in any technically feasible combination:

during stage c), the angle of inclination between the main transmit axis of the transmitter and the normal to the surface that has reflected the waves picked up by the receiver is determined by computing the gradient of the curve representing the normalized energy of the signal received by said receiver over time, said gradient being a function of the angle of inclination and satisfying a relationship predetermined by experimental measurements;

the transmitter and the receivers are ultrasonic;

the edge is the edge coping of a boarding platform, and the reference plane is carried by a rail vehicle having a moving step; and the waves are transmitted from a single transmitter disposed mid-way between two receivers while being in alignment with them.

The invention also provides apparatus for locating, in a reference plane, an edge disposed at the junction between two substantially plane surfaces by means of a method as described above, said apparatus comprising at least one transmitter and at least two receivers disposed in the reference plane, said transmitter having a transmit solid angle making it possible for at least some waves transmitted by said transmitter to reach both of the surfaces on either side of said edge, the receivers being disposed in the reference plane such that one of the receivers essentially receives the waves reflected by one of the surfaces while the other receiver essentially receives the signals reflected by the other surface, the positions of said transmitter and of said receivers in the reference plane being known by construction.

In particular embodiments, the location apparatus of the invention may have one or more of the following characteristics taken in isolation or in any technically feasible combination:

the edge is the edge coping of a boarding platform, and the reference plane is carried by a rail vehicle having a moving step;

the moving step supports a single transmitter and two receivers disposed in a plane perpendicular to the longitudinal axis of the rail vehicle, said receivers being disposed on either side of the transmitter while being in alignment on a straight line inclined relative to the vertical;

the straight line on which the receivers and the transmitter are in alignment is inclined by about 30° relative to the vertical; and the transmitter and the receivers are ultrasonic transducers.

The invention also provides a method of guiding a moving element relative to an edge disposed at the junction between two substantially plane surfaces, said method including a location stage during which the edge is located by means of the above-described method.

According to another characteristic of the guiding method of the invention, the location stage is performed iteratively while the moving element is being guided relative to the edge.

According to yet another characteristic of the guiding method of the invention, the moving element is a step on a rail vehicle and the edge is the edge coping of a platform, the step supporting a single transmitter and two receivers disposed in a plane perpendicular to the longitudinal axis of the rail vehicle, the receivers being disposed on either side of the transmitter while being in alignment on a straight line inclined relative to the vertical.

According to yet another characteristic of the invention, when the location method does not make it possible to locate the platform edge coping, the travel times of the waves transmitted by the transmitter and received by the receivers after being reflected off the platform are compared to determine whether the step is situated above or below the platform edge coping.

BRIEF DESCRIPTION OF THE DRAWINGS

The objects, aspects, and advantages of the present invention will be better understood on reading the following description of a particular embodiment of the invention given by way of non-limiting example and with reference to the accompanying drawings, in which.

MORE DETAILED DESCRIPTION

To make the drawings easier to understand, only those elements which are required to understand the invention are shown. Like elements bear the same references from one figure to another.

Figure 1:
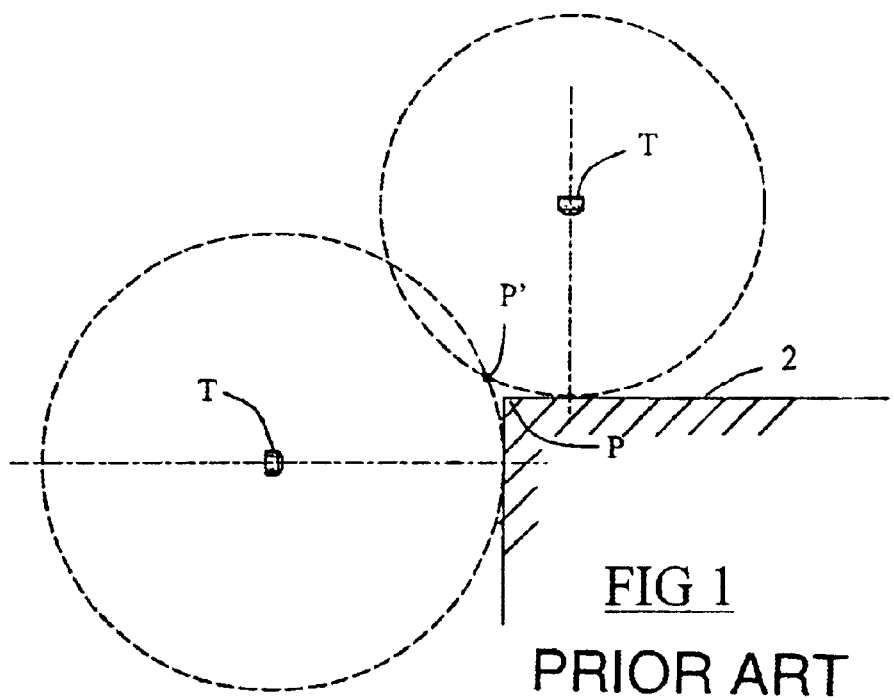
FIGS. 1 and 2 are views diagrammatically showing the principle of location by triangulation in the above-described prior art.
Figure 2:
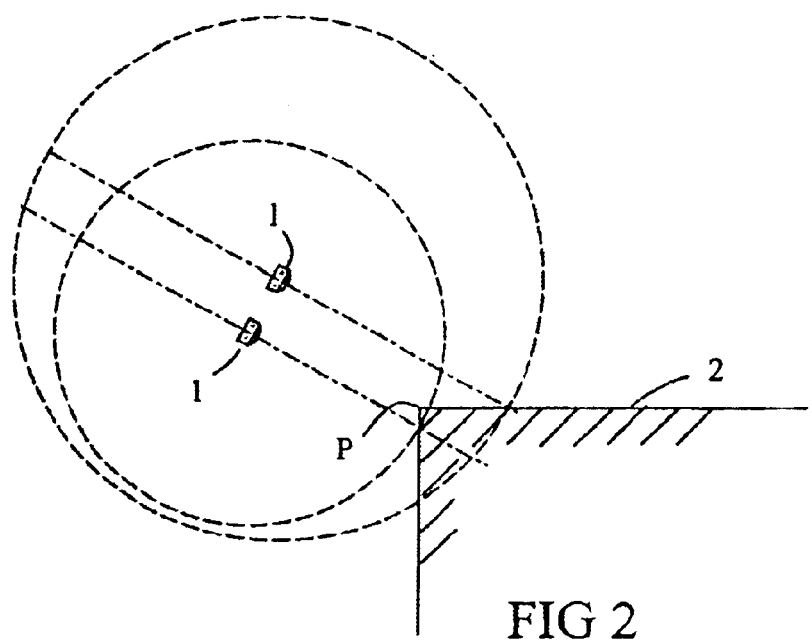
Figure 3:
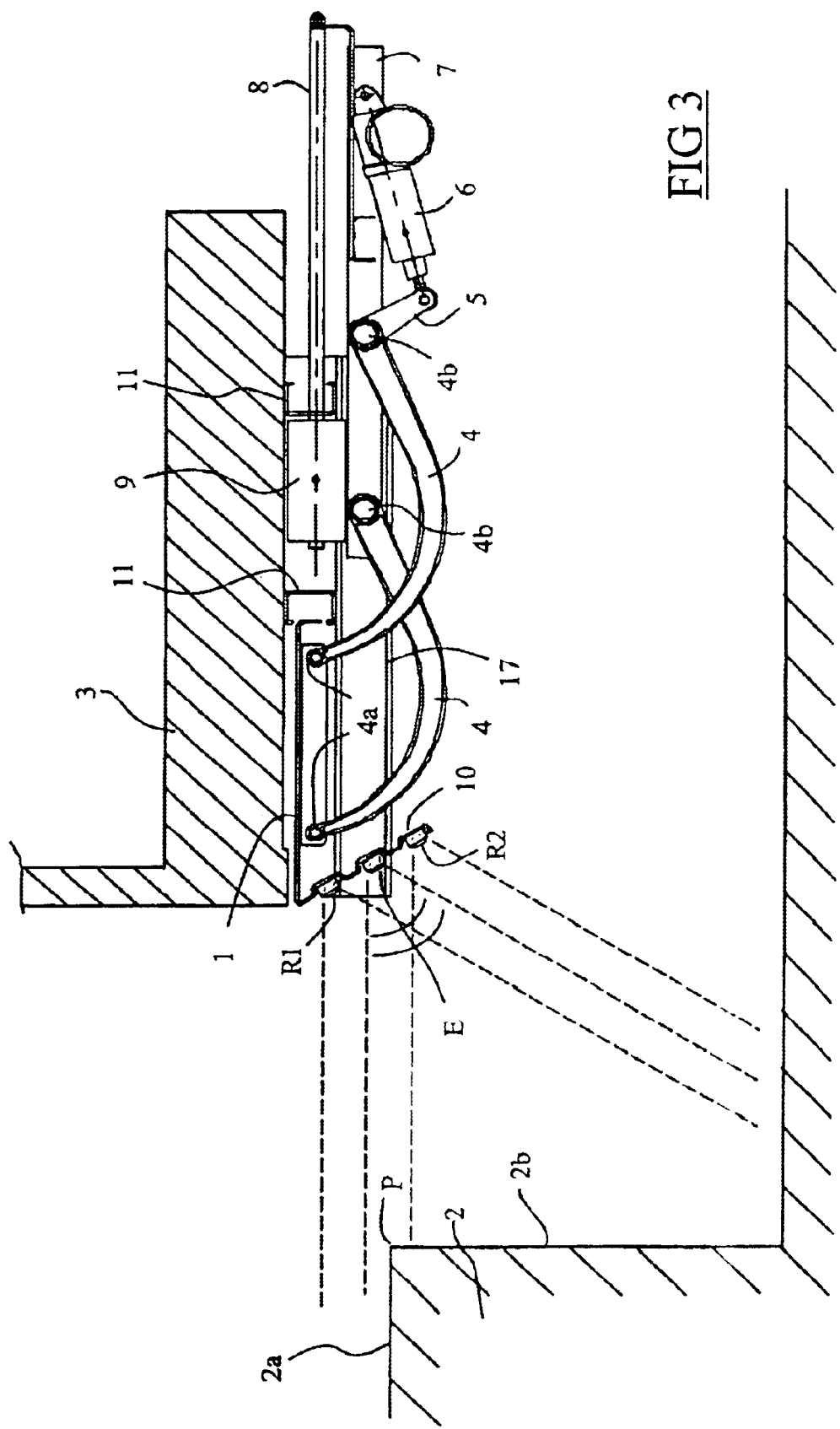
FIG. 3 is a view in section on a vertical plane of a retractable step of a rail vehicle in the folded-away position, the step being equipped with locating and guiding apparatus of the invention for locating the platform edge coping and for guiding the step relative thereto.
Figure 4:
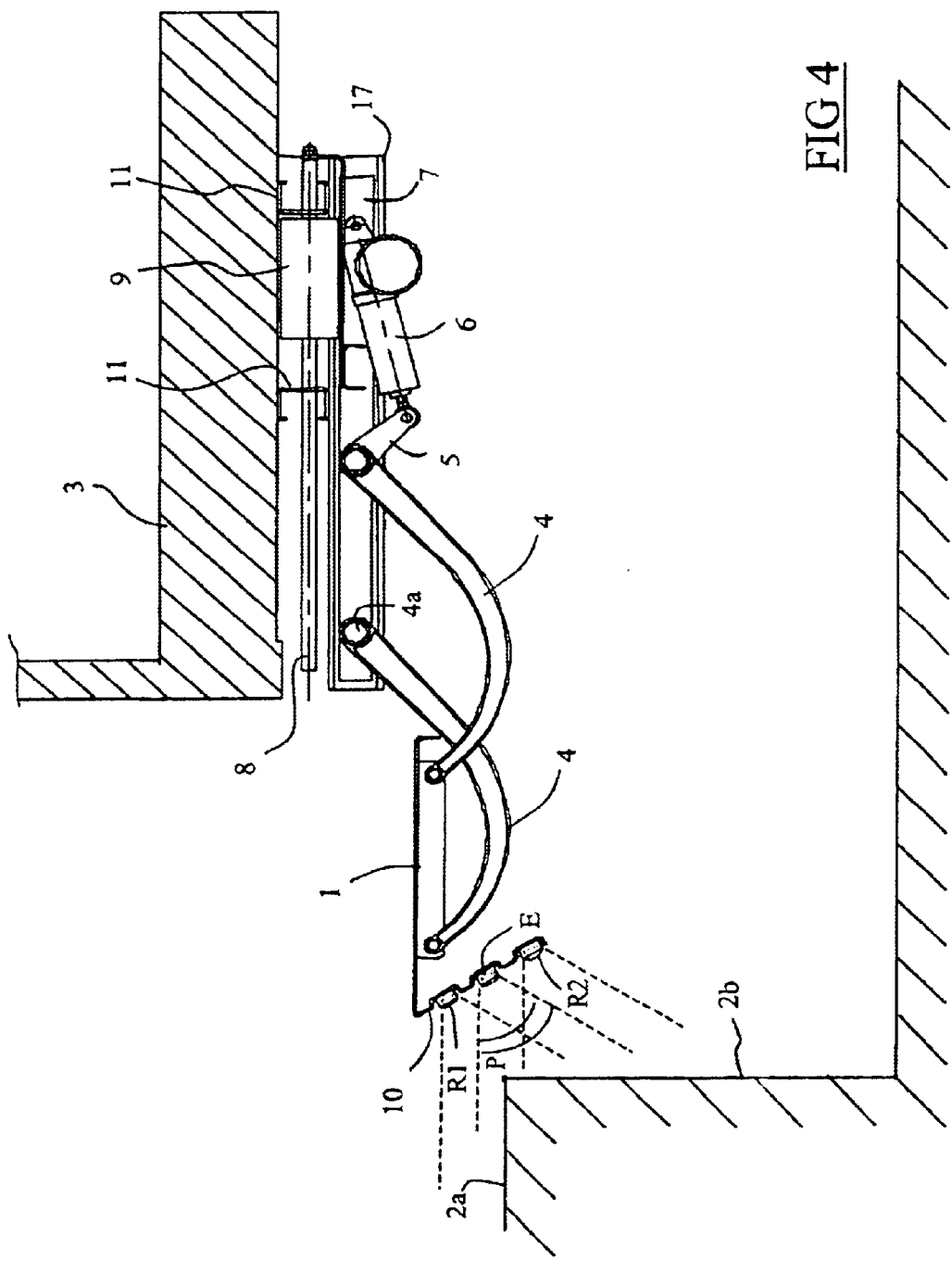
FIG. 4 is a view similar to FIG. 3 when the retractable step is in the deployed position.

FIGS. 3 and 4 show the bottom portion of a rail vehicle 3 stopped in the vicinity of a platform 2, the vehicle having a retractable step 1 provided with location apparatus of the invention. In the description below, only the mechanism supporting one side of the retractable step 1 is described with reference to FIGS. 3 and 4, the step 1 having a similar mechanism on the other side.

As shown in FIG. 3, the step 1 is formed by a horizontal plate having a front edge to which location apparatus is attached that is constituted by an instrument-carrying wall 10. The instrument-carrying wall 10 extends under the step 1 at a angle of about 30° to the vertical, and supports an ultrasonic remote measurement system made up of two receivers R1 and R2 and of one transmitter E. For example, the transmitter E and the receivers R1 and R2 may be Murata waterproof ultrasonic transducers, respectively of the MA40E7S type and of the MA40E7R type. Such ultrasonic transmitter or receiver transducers offer the advantage of having respective transmit and receive solid angles of about 60°.

The receivers R1 and R2 are disposed respectively at the top edge and at the bottom edge of the instrument-carrying wall 10, and the transmitter is disposed midway between the two receivers R1 and R2. The back faces of the receivers R1 and R2 and of the transmitter E are disposed against the instrument-carrying wall 10 so that the axis of the transmit cone of the transmitter E and the axis of the receive cone of each receiver R1 and R2 are inclined relative to the horizontal by 30° downwards. The transmitter E and the receivers R1 and R2 are connected to a computer (not shown) for processing the measured signals.

The step 1 is supported at each of its side ends by two links 4 in the form of goosenecks, the heads of the two links 4 being fixed in the vicinities respectively of the front edge and of the back edge of the step 1 by means of respective hinges 4a. Each link 4 also has a foot connected via a hinge 4b to a slide 7 mounted to move in a horizontal slideway 17 fixed under the vehicle 3 via two fixing brackets 11. The link 4 that is connected to the back portion of the step 1 is secured to a lever 5 extending perpendicularly to the foot of the link, the end of said lever 5 being fixed to the head of an electric actuator 6 whose foot is fixed to the slide 7. As shown in FIG. 4, the rod of the electric actuator 6 turns the back link 4, thereby causing the step 1 to be moved vertically.

Horizontal movement of the step 1 can be controlled independently of the movement of the links 4, by moving the slide 7 in the horizontal slideway 17, the back end of the slide 7 being connected via an angle bar having a rack provided with a worm screw 8 driven in translation by a wheel connected to an electric motor 9 carried by the slideway 17.

The method of locating the step 1 relative to the platform 2 is described below.

As shown in FIGS. 3 and 4, one or more ultrasound waves are transmitted towards the platform 2 from the transmitter E on the-moving step 1 when the rail vehicle is stopped in a passenger station. Since the transmit solid angle of the transmitter is about 60°, as shown in dashed lines in the figures, the waves transmitted by the transmitter E generally reach the edge coping P of the platform 2 and are reflected both by the top face 2a of the platform 2 and by its side face 2b. After they reflect off the platform 2, the echoes of said waves are measured at the receivers R1 and R2, each of said receivers having a receive solid angle of about 60° shown in dashed lines in the figures.

Figure 5:
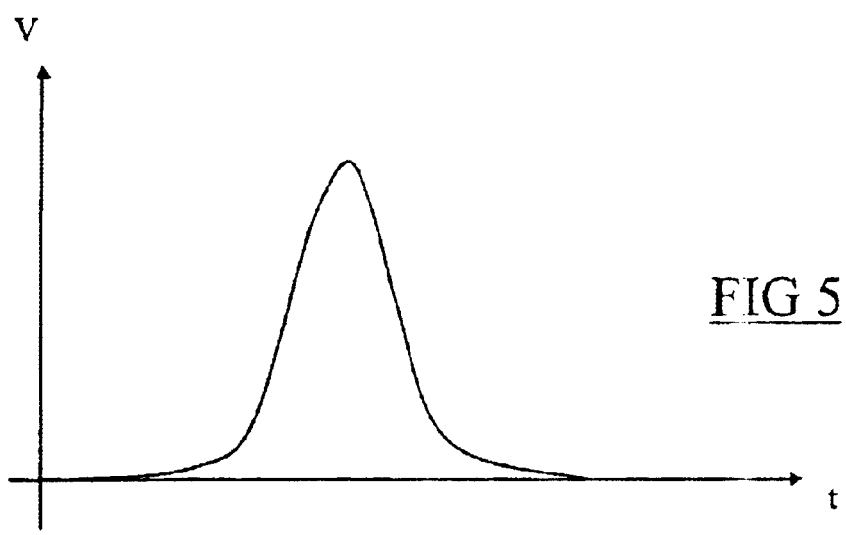
FIG. 5 is a graph showing the general appearance over time of the voltage of the signal delivered by one of the receiver transducers of the location apparatus of the invention when it receives the echo of a wave transmitted by a transmitter.
Figure 6:
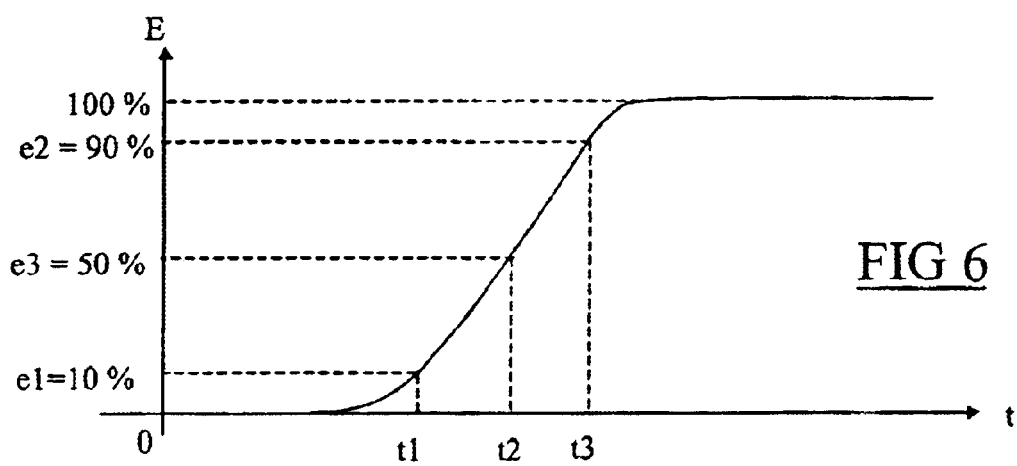
FIG. 6 is a graph showing the general appearance over time of the energy of the signal picked up by one of the receiver transducers of the location apparatus of the invention when it receives the echo of a wave transmitted by a transmitter.

An example of the appearance over time of the signal delivered by the receivers R1 or R2 is shown in FIG. 5. As shown in FIG. 5, a wave peak resulting in a voltage peak is measured by the receivers R1 or R2. By means of a processing computer, the signals measured by the receivers R1 and R2 are integrated in real time, and then normalized relative to the total energy received by the corresponding receiver, to obtain a curve of the energy of the measured signal lying in the range 0% to 100% as shown in FIG. 6.

In a following stage of the method, the processing computer determines the gradient of the curve of the normalized energy measured at each of the detectors R1 and R2 by computing the gradient of the straight line passing, for example, through the points e1 and e2 for which the energy is respectively equal to 10% of the total measured energy and 90% of said total measured energy. On the basis of the value of the gradient of the curve of the normalized energy corresponding to the receivers R1 and R2, the computer deduces respectively the angles α1 and α2 formed by the normals to the wave reflection surfaces relative to the axis of the transmit cone of the transmitter E. The value of each of the angles α1 and α2 is computed by means of an equation giving the value of the angle α as a function of the gradient of the curve of the normalized energy, said equation being obtained previously by measuring experimentally the various gradients of the curve of the normalized energy for each of the receivers R1 and R2 when the instrument-carrying wall 10 is placed in front of a reflection surface inclined at different inclinations.

Figure 7:
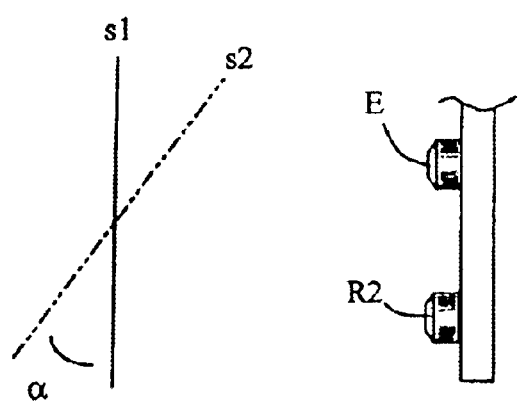
FIG. 7 is a diagrammatic fragmentary view showing location apparatus of the invention facing two reflection walls that are inclined differently.
Figure 8:
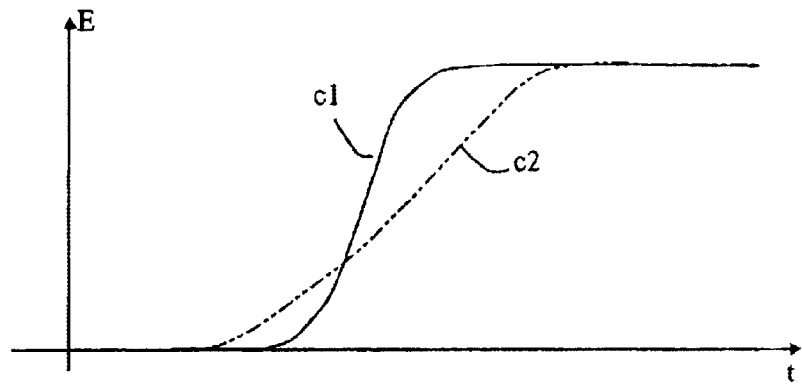
FIG. 8 is a graph showing the energy of the signal picked up by the receiver of the location apparatus of FIG. 7 as a function of the inclination of the reflection wall.

The Applicant has observed that the normalized energy curve is substantially constant for any given receiver, and that the gradient of the energy curve is a function of the angle formed by the reflection surface relative to the transmitter. By way of example, with reference to FIG. 7, when a wave transmitted by the transmitter E is reflected by a surface s1 perpendicular to the axis of the transmit cone, the curve of the normalized energy measured by means of the detector R2 is similar to the curve c1 shown in FIG. 8, and when the wave transmitted by the transmitter E is reflected by a surface s2 forming an angle α with the surface s1, the curve of the normalized energy measured by means of the detector R1 is similar to the curve c2.

Figure 9:
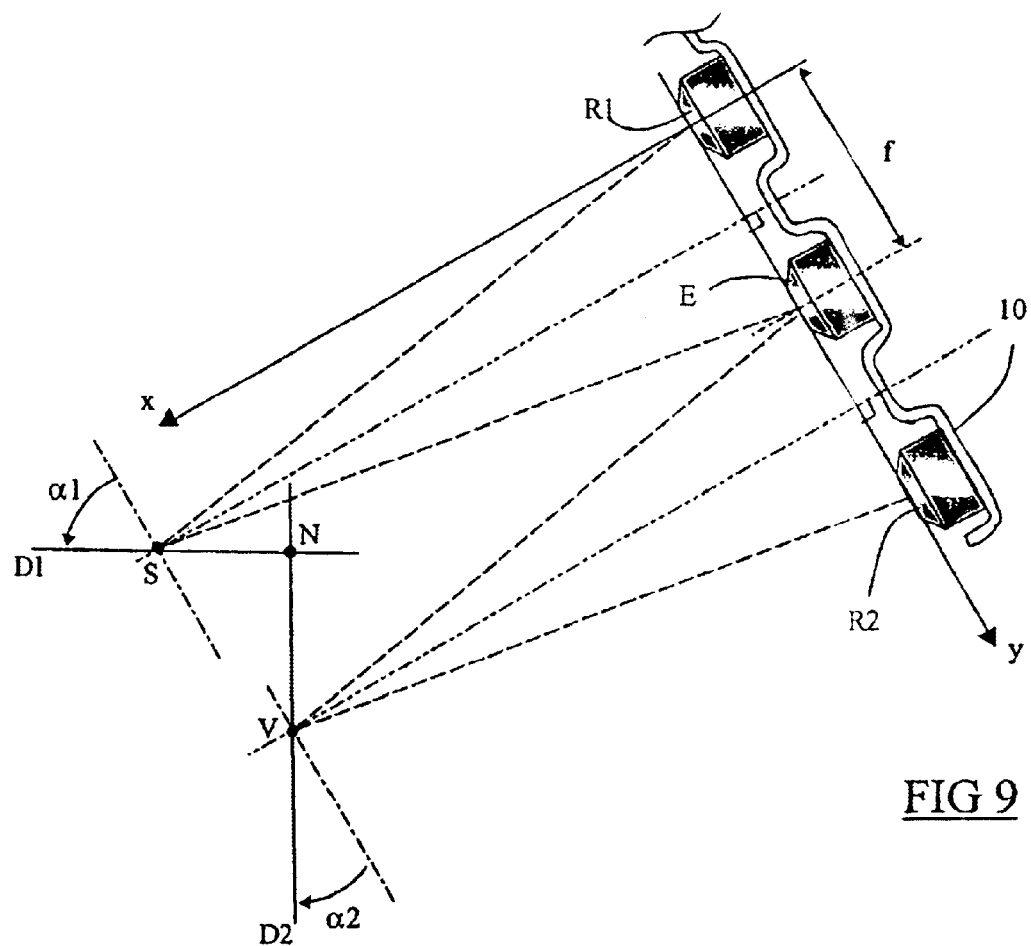
FIG. 9 is a diagram geometrically showing how the position of the platform edge coping is determined during the last stage of the location method of the invention.

In another stage of the method, the computer determines the co-ordinates of the main point of impact of the waves on the surface of the platform 2 that has reflected the waves. As shown in FIG. 9, the co-ordinates of said point of impact are determined by estimating that the point of impact that has reflected the largest proportion of the transmitted waves lies on the mid-perpendicular of the segment formed by the transmitter E and by the corresponding receiver R1 or R2, i.e., with reference to the figure, point S for the receiver R1 and point V for receiver R2. The co-ordinates of the point S can be determined by estimating that the travel time taken by the wave transmitted by the transmitter E, and then reflected at the point S, finally to be measured by receiver R1 corresponds substantially to the travel time measured for e3=50% on the curve of the normalized energy measured by the detector R1. This travel time corresponds to a distance d1 obtained by dividing the travel time by the speed of propagation of the ultrasound wave. Similarly, the co-ordinates of the point V are determined by estimating that the travel time taken by the wave transmitted by the transmitter E, and then reflected at the point V, finally to be measured by the receiver R2 corresponds substantially to the travel time measured for e3=50% on the curve of the normalized energy measured by the detector R2. This travel time corresponds to a distance d2 obtained by dividing the travel time by the speed of propagation of the ultrasound wave.

Since the distance f between the transmitter E and the receivers R1 and R2 is known by construction, the co-ordinates of the points S and V in the reference frame xR1y may be written by approximation:

$$S = \begin{pmatrix} xs \approx d1/2 \\ ys = f/2 \end{pmatrix}$$

$$V = \begin{pmatrix} xv \approx d2/2 \\ yv = 3f/2 \end{pmatrix}$$

On the basis of knowledge of the co-ordinates of the points S and V, the computer then determines merely by geometrical construction the co-ordinates of the point N corresponding to the intersection where the straight line D1 passing through S of gradient α1 intersects the straight line D2 passing through V of gradient α2, where α1 and α2 are the angles determined during the preceding stage of the method. The co-ordinates of the point N obtained in this way give a good estimation of the position of the edge coping P of the platform 2.

Such a location method offers the advantage of enabling a platform edge coping to be located accurately with receivers and transmitters disposed close together. The location apparatus of the invention also offers the advantage of requiring only one transmitter and two receivers in order to operate.

The invention also relates to a method of guiding the step 1, which method incorporates the above-described method of locating the platform edge coping P so as to bring the step 1 into an optimized position relative to the platform edge coping P.

Such a method of guiding the step 1 advantageously uses the above-described location method iteratively so as to know the position of the step 1 relative to the platform edge coping P at any time, and acts accordingly on the electric actuator 6 and on the motor 9 respectively controlling the height and the lateral position of the step 1 so as to bring said step into the desired position.

In a preferred implementation, the guiding method also takes account of the cases when the location method does not make it possible to obtain the co-ordinates of the point N because the zone swept by the transmitter E does not reach the edge coping P of the platform 2. Such a case can occur when the platform 2 is very high and when the step 1 is in a position that is too low for the waves transmitted by the transmitter E to be reflected by the top surface 2a of the platform 2. Such a case may also occur when the platform 2 is very low and when the step 1 is in a position that is too high for the waves transmitted by the transmitter E to be reflected by the side face 2b of the platform 2.

These cases are detected by the guiding method merely by analyzing the angles formed between the straight lines D1 and D2 computed by the location method: said angles should normally always remain close to 90°. Thus, when the straight lines D1 and D2 from the location method form an angle between them that is smaller than a given threshold, e.g. 60°, the guiding method compares the travel times of the wave transmitted by the transmitter E and picked up by the receivers R1 and R2 to detect whether the waves are reflected by the top surface 2a or by the side surface 2b of the platform. When the travel time of the wave picked up by the receiver R1 is shorter than the travel time of the wave picked up by the receiver R2, that indicates that the instrument-carrying wall 10 is facing the side wall 2b of the platform 2, and the guiding method controls the electric actuator 6 so as to raise the step 1 until the instrument-carrying wall 10 can detect the edge coping of the platform 2.

Conversely, when the travel time of the wave picked up by the receiver R1 is longer than the travel time of the wave picked up by the receiver R2, that indicates that the instrument-carrying wall 10 is above the top wall 2a of the platform 2 and the guide method controls the electric actuator 6 so as to lower the step 1 until the instrument-carrying wall 10 can detect the edge coping of the platform 2.

Naturally, the invention is in no way limited to the implementation described and shown, which is given merely by way of example. Modifications remain possible, in particular concerning the make up of the various elements, or the use of equivalent substitute techniques, without going beyond the scope of protection of the invention.

Thus, in the above-described embodiment, the angle of inclination of the instrument-carrying wall relative to the vertical is chosen to be equal to 30°. However, in variant embodiments, the angle may be modified and preferably lie in the range 20° to 70°.

What is claimed is:

1. A method of locating, in a reference plane, an edge that is disposed at the junction between two surfaces that are substantially plane, said reference plane being substantially perpendicular to the surfaces, said method comprising the following stages:
  a) transmitting waves from at least one transmitter disposed in the reference plane, said transmitter having a transmit solid angle that enables at least some transmitted waves to reach both of the surfaces on either side of said edge;
  b) receiving the echoes of the waves transmitted by the transmitter in at least two receivers which are disposed in the reference plane such that one of the receivers essentially receives the waves reflected by one of the surfaces while the other receiver essentially receives the signals reflected by the other surface, the positions of the receivers and of the transmitter in the reference plane being known by construction;
  c) analyzing the energy of the signal received by each receiver to determine the value of the angle of inclination between the main transmit axis of the transmitter and the normal to the surface that has reflected the waves picked up by said receiver;
  d) computing the position in the reference plane of the point of impact of the waves on each surface by measuring the travel time of the signal transmitted by the transmitter and received by each receiver; and
  e) locating said edge in the reference plane by computing the point corresponding to the intersection of the straight lines passing through the two points of impact and forming respective angles with the main transmit axis of the transmitter.

2. A location method according to claim 1, wherein, during stage c), the angle of inclination is determined by computing the gradient of the curve representing the normalized energy of the signal received by said receiver over time, said gradient being a function of the angle of inclination and satisfying a relationship predetermined by experimental measurements.

3. A location method according to claim 1, wherein the transmitter and the receivers are ultrasonic.

4. A location method according to claim 1, wherein said edge is the edge coping of a boarding platform, and the reference plane is carried by a rail vehicle having a moving step.

5. A location method according to claim 1, wherein the waves are transmitted from a single transmitter disposed mid-way between two receivers while being in alignment with them.

6. Apparatus for locating, in a reference plane, an edge disposed at the junction between two surfaces by the method of claim 1, said apparatus comprising at least one transmitter and at least two receivers disposed in the reference plane, said transmitter having a transmit solid angle making it possible for at least some waves transmitted by said transmitter to reach both of two surfaces on either side of said edge, said receivers being disposed in the reference plane such that one of the receivers essentially receives the waves reflected by one of the surfaces while the other receiver essentially receives the signals reflected by the other surface, the positions of said transmitter and of said receivers in the reference plane being known by construction.

7. Location apparatus according to claim 6, wherein the edge is the edge coping of a boarding platform, and the reference plane is carried by a rail vehicle having a moving step.

8. Location apparatus according to claim 7, wherein said moving step supports a single transmitter and two receivers disposed in a plane perpendicular to the longitudinal axis of the rail vehicle, said receivers being disposed on either side of the transmitter while being in alignment on a straight line inclined relative to the vertical.

9. Location apparatus according to claim 8, wherein said straight line on which the receivers and the transmitter are in alignment is inclined by about 30° relative to the vertical.

10. Location apparatus according to claim 9, wherein said transmitter and said receivers are ultrasonic transducers.

11. A location method according to claim 1 further comprising a step of guiding a moving element relative to an edge disposed at junction between two substantially plane surfaces, wherein said step of guiding includes a location stage during which the edge is located.

12. A location method according to claim 11, wherein said location stage is performed iteratively while the moving element is being guided relative to the edge.

13. A location method according to claim 12, wherein said moving element is a step on a rail vehicle and the edge is the edge coping of a platform, said step supporting a single transmitter and two receivers disposed in a plane perpendicular to the longitudinal axis of the rail vehicle, the receivers being disposed on either side of the transmitter while being in alignment on a straight line inclined relative to the vertical.

14. A location method according to claim 13, wherein, when the location method does not make it possible to locate the platform edge coping, the travel times of the waves transmitted by the transmitter and received by the receivers after being reflected off the platform are compared to determine whether the step is situated above or below the platform edge coping.

* * * * *